(12) United States Patent
Alt et al.

(10) Patent No.: US 11,940,044 B2
(45) Date of Patent: Mar. 26, 2024

(54) ELECTRIC DRIVE UNIT FOR A MOTOR VEHICLE

(71) Applicant: BPW Bergische Achsen KG, Wiehl (DE)

(72) Inventors: Marie Kristin Alt, Wiehl (DE); David Schmidt, Nümbrecht (DE); Frank Löhe, Ruppichteroth (DE); Dominik Brunner, Berg (CH); Urs Steiner, Bronschhofen (CH)

(73) Assignee: BPW Bergische Achsen KG, Wiehl (DE)

( * ) Notice: Subject to any disclaimer, the term of this patent is extended or adjusted under 35 U.S.C. 154(b) by 340 days.

(21) Appl. No.: 17/626,522

(22) PCT Filed: Jul. 7, 2020

(86) PCT No.: PCT/DE2020/100594
§ 371 (c)(1),
(2) Date: Jan. 12, 2022

(87) PCT Pub. No.: WO2021/008653
PCT Pub. Date: Jan. 21, 2021

(65) Prior Publication Data
US 2022/0228658 A1 Jul. 21, 2022

(30) Foreign Application Priority Data
Jul. 12, 2019 (DE) ..................... 10 2019 118 958.6

(51) Int. Cl.
*F16H 57/04* (2010.01)
*B60K 7/00* (2006.01)
(Continued)

(52) U.S. Cl.
CPC ....... *F16H 57/0486* (2013.01); *B60K 7/0007* (2013.01); *B60K 17/046* (2013.01);
(Continued)

(58) Field of Classification Search
CPC ............... F16H 57/0486; F16H 57/029; F16H 57/0424; F16H 57/0471;
(Continued)

(56) References Cited

U.S. PATENT DOCUMENTS 4,418,777 A * 12/1983 Stockton ............. F16H 57/0413
184/6.12
5,443,130 A 8/1995 Tanaka et al.
(Continued)

FOREIGN PATENT DOCUMENTS

DE 10 2012 202 460 4/2013
DE 10 2012 112 379 6/2014
(Continued)

*Primary Examiner* — Jacob B Meyer
(74) *Attorney, Agent, or Firm* — Gudrun E. Huckett (57) ABSTRACT

The invention relates to an electric drive unit for a motor vehicle, comprising an electric drive and a multi-stage transmission (6), which is connected downstream of the electric drive and which is arranged, alone or together with the electric drive, in a drive housing (4). The drive housing is composed of a housing shell (11), the interior (11a) of which annularly surrounds the transmission (6), and an end wall (12), which is formed integrally with the housing shell (11). The end wall is provided, at the center thereof, with a transmission opening (17) for the transmission output shaft (18) of the transmission (6). Cooling liquid is conducted through the drive housing in order to cool the components of the transmission. In order to improve the cooling performance while utilizing precisely the design-related particularities of the electric drive unit, a ring chamber (33) arranged around the transmission opening (17) is provided on the outside of the end wall (12), and coolant channels (35)

(Continued)

are formed in the drive housing (4), which coolant channels lead from the interior (11*a*) of the housing shell (11) into the ring chamber (33).

18 Claims, 4 Drawing Sheets

(51) Int. Cl.
*B60K 17/04* (2006.01)
*F16H 57/029* (2012.01)
*F16H 57/02* (2012.01)

(52) U.S. Cl.
CPC ....... *F16H 57/029* (2013.01); *F16H 57/0424* (2013.01); *B60K 2007/0092* (2013.01); *F16H 2057/02034* (2013.01); *F16H 2057/02052* (2013.01); *F16H 57/0471* (2013.01)

(58) Field of Classification Search
CPC . F16H 2057/02034; F16H 2057/02052; B60K 7/0007; B60K 17/046; B60K 2007/0092
See application file for complete search history.

(56) References Cited

U.S. PATENT DOCUMENTS

| | | | |
|---|---|---|---|
| 5,519,269 A * | 5/1996 | Lindberg | H02K 9/197 310/58 |
| 6,398,685 B1 | 6/2002 | Wachauer et al. | |
| 7,059,443 B2 | 6/2006 | Kira | |
| 7,823,696 B2 * | 11/2010 | Baba | F16H 57/0483 184/6.12 |
| 9,400,034 B1 * | 7/2016 | Pritchard | B60K 1/00 |
| 2005/0245341 A1 | 11/2005 | Mueller et al. | |
| 2011/0192245 A1 | 8/2011 | Shioiri et al. | |
| 2016/0355083 A1 | 12/2016 | Kuroda et al. | |
| 2017/0361697 A1 | 12/2017 | Haupt et al. | |
| 2018/0245676 A1 | 8/2018 | Wurzberger et al. | |
| 2022/0228658 A1 * | 7/2022 | Alt | F16H 57/029 |
| 2022/0234438 A1 * | 7/2022 | Brunner | F16H 57/0412 |

FOREIGN PATENT DOCUMENTS

| | | |
|---|---|---|
| WO | 2007/013642 | 2/2007 |
| WO | 2013/029682 | 3/2013 |

* cited by examiner

ELECTRIC DRIVE UNIT FOR A MOTOR VEHICLE

BACKGROUND OF THE INVENTION

The invention relates to an electric drive unit for a motor vehicle, having an electric drive, a multi-stage transmission which is connected downstream of the electric drive and is arranged by itself or together with the electric drive in a drive housing which is comprised of a housing shell, the inner side of which annularly surrounds the transmission, and an end wall which is formed integrally with the housing shell and is provided centrally with a transmission opening for the transmission output shaft of the transmission, wherein cooling liquid is conducted through the drive housing in order to cool the components of the transmission.

Such an electric drive unit is used as a traction drive of a vehicle. For use, it is part of an electric drive axle for a utility vehicle. In this type of vehicle axle, a multi-stage transmission is connected downstream of the electric drive, which is arranged advantageously in terms of weight in the vicinity of the center of the vehicle. The transmission is arranged by itself or together with the electric drive in a drive housing which is comprised of a substantially cylindrical housing shell and an end wall formed integrally with the housing shell. The inner side of the housing shell of the drive housing annularly surrounds the transmission elements mounted therein, and the end wall of the drive housing is provided centrally with a transmission opening through which the transmission output shaft leads out of the transmission. The transmission output shaft is either simultaneously the drive shaft leading to the respective vehicle wheel, or it is connected for conjugate rotation to a separate drive shaft. The transmission output shaft or the drive shaft rotates in a predominantly tubular axle housing of the electric drive axle. At its end facing the transmission, the axle housing is fastened rigidly to the end side of the drive housing and, at its other end, has a steering knuckle on which the driven vehicle wheel is rotatably mounted.

In order to cool the transmission elements, cooling liquid is conducted through the drive housing serving as the transmission housing, wherein this takes place in the form of a circuit in which the cooling liquid flows as far as possible through all the mechanically loaded regions of the transmission, including the rolling bearings which are present, for which purpose the cooling liquid is circulated within the drive housing.

The circulation of the cooling liquid within the drive housing runs into limits in the case of mechanically highly loaded transmissions since the transmissions are often of very compact design and there is little spare construction space for accommodating the assemblies required for even better cooling efficiency in the existing housing.

The invention is therefore based on the object of improving the cooling efficiency of an electric drive unit, part of which is a drive housing with a liquid-cooled transmission arranged therein, making use specifically of the design-induced characteristics of the electric drive unit.

SUMMARY OF THE INVENTION

To achieve this object, an annular chamber is proposed in an electric drive unit of the type indicated at the beginning, which annular chamber is arranged around the transmission opening on the outside of the end wall, wherein coolant channels are formed in the drive housing, these coolant channels leading from the inner side of the housing shell into the annular chamber.

According to the invention, part of the coolant recirculation is therefore an annular chamber which is, however, not arranged in the interior of the drive housing, but rather is arranged around the transmission opening on the outside of the end wall of the drive housing. In order that cooling liquid enters this annular chamber, coolant channels are formed in the drive housing, these coolant channels leading from the inner side of the housing shell into the annular chamber.

The arrangement of the annular chamber on the outside of the end wall of the drive housing is advantageous since the drive housing offers little spare construction space in its interior, and since, due to the design, part of the electric drive axle is in any case an axle housing which is fastened to that end wall on which, according to the invention, the annular chamber is located.

Owing to the design-induced characteristic of the electric drive axle, an annular chamber can therefore be realized for circulating the cooling liquid. The annular chamber is delimited on the one hand by the end wall of the drive housing and on the other hand by an annular region which is formed on the axle housing. The annular chamber is therefore not solely formed by the drive housing, but rather by the design-induced combination of drive housing and the axle housing which is fastened thereto on the end side and surrounds the transmission output shaft.

A refinement is preferred in which the annular chamber is partially formed, namely by the drive housing, by a conduit in the outer side of the end wall, and in which the axle housing, facing the drive housing, is provided with a flange. The flange of the axle housing is fastened to the end wall, and the annular region which together with the conduit formed in the end wall forms the annular chamber, i.e., delimits or surrounds the latter, is located on the flange.

The axle housing is part of the electric drive axle and is provided on its end facing away from the flange with a steering knuckle for the mounting of a vehicle wheel.

According to one refinement of the drive unit, a coolant connection piece is arranged on the flange, and a coolant channel leads from the coolant connection piece into the annular chamber in order to fill the latter, for example, with fresh coolant, or in order to continuously pump in coolant in the case of active circulation cooling.

A first and a second seal between the flange and the end wall are furthermore preferred. Preferably, the first seal is an annular seal arranged between the annular chamber and the central transmission opening, and the second seal is an annular seal arranged around the annular chamber. Preferably, the annular seals sit in annular grooves which are open toward the outer side of the end wall, wherein the annular grooves are formed in the end wall.

According to a further refinement, the two seals are arranged offset axially with respect to each other in the longitudinal direction of the transmission output shaft, wherein the second seal is the seal closer on the drive side.

According to a further refinement, further coolant channels are formed in the drive housing, wherein the further coolant channels lead from the annular chamber through the end wall as far as the inner side thereof. Via these further coolant channels, the coolant can therefore leave the annular chamber and can flow back again into the interior of the drive housing. Preferably, the further coolant channels are bores which are arranged with respect to the central axis on a diameter which is smaller than the diameter on which the coolant channels are arranged.

It is advantageous in terms of production if the axes of the further coolant channels are oriented parallel to the central axis.

With regard to a favorable flow through the annular chamber, it is advantageous if the further coolant channels open on the base, and the coolant channels open in the side wall of the annular chamber which is in the form of a conduit.

Furthermore, it is proposed that the flange of the axle housing is fastened to the end wall of the drive housing by means of a plurality of screws arranged on a common pitch circle. The diameter of the pitch circle is preferably larger than the largest diameter of the annular chamber, and preferably larger than the diameter of the second seal.

Preferably, the screws engage by way of their threads in threaded blind holes which are formed in the end wall.

For a compact design of the drive housing and of the fastening of the axle housing thereto, it is advantageous if the coolant channels lead into the annular chamber on those circumferential portions on which no threaded blind holes are formed in the end wall.

Furthermore, it is proposed that the end wall and the flange are oriented axially with respect to each other by centering surfaces which are formed thereon and are in mutual contact.

Preferably, the centering surfaces are arranged on a diameter which is smaller than the smallest diameter of the annular chamber and is larger than the diameter of the first seal.

BRIEF DESCRIPTION OF THE DRAWINGS

Further advantages and details of the electric drive axle for a utility vehicle emerge from the description below of an exemplary embodiment which is reproduced in the drawing. In detail.

DESCRIPTION OF PREFERRED EMBODIMENTS

Figure 3:
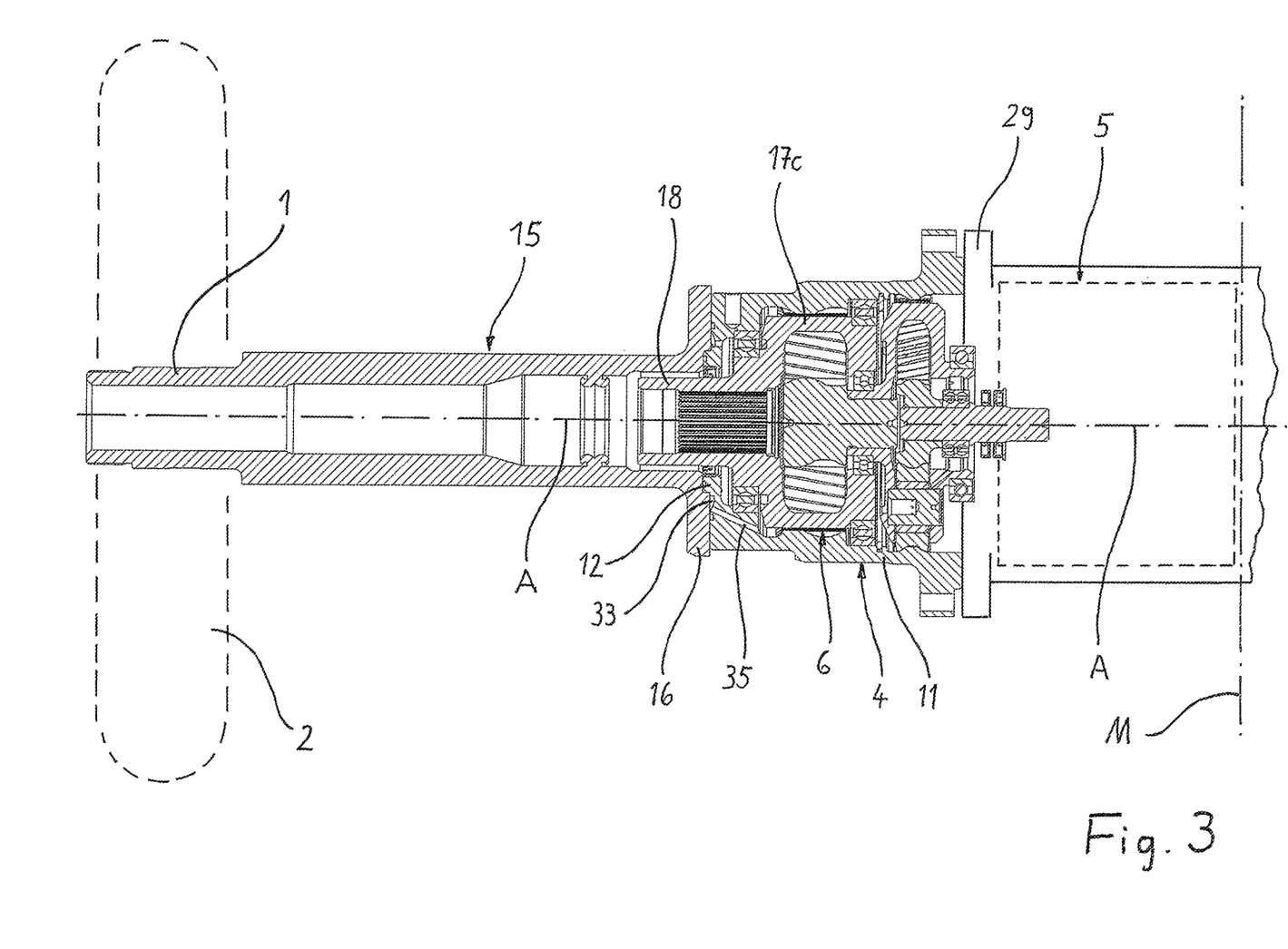
FIG. 3: shows a longitudinal section through the one half of the electric drive axle along an offset sectional plane denoted by "III-III" in FIG. 2.

FIG. 3 shows, in a partial longitudinal section that is used here as an overview illustration, the one half of an electric drive axle for a motor vehicle. The illustrated half of the drive axle is used for driving a vehicle wheel 2 which is mounted rotatably on a steering knuckle 1 and is illustrated by dashed lines at the left edge in FIG. 3. The similarly designed second half of the drive axle is located symmetrically on the other side of the vehicle center plane M plotted in FIG. 3, and carries the respective vehicle wheel of the other side of the vehicle. The electric drive axle in its entirety is a rigid axle continuing from the one side of the vehicle to the other.

For each side of the vehicle, and therefore for driving the respective vehicle wheel 2, an electric drive 5, in particular an electric motor, is provided in the vicinity of the vehicle center plane M. A transmission 6, here in the form of a two-stage planetary gearing, is in each case connected downstream of each electric motor toward the outside of the vehicle.

The two electric drives 5 and two transmissions 6 of the electric drive unit are situated in a drive housing 4 which can be in single-part or multi-part form. In the embodiment described here, the drive housing 4 is comprised of three parts or sections, wherein both electric drives 5 are situated in a common drive housing part, and each of the two transmissions 6 in a further dedicated drive housing part. Alternatively, for each side of the vehicle, the electric drive 5 can be arranged together with its transmission 6 in a common drive housing 4.

The drive housing 4 is therefore at the same time the transmission housing of the drive unit and is comprised of a substantially cylindrical housing shell 11, the inner side 11a of which annularly surrounds the transmission elements of the transmission 6, and of an end wall 12 formed integrally with the housing shell 11. The end wall 12 is predominately closed, but leaves a transmission opening 17 free in its center, through which the transmission output shaft 18, which rotates on the central axis of rotation A, of the transmission 6 leads.

The transmission output shaft 18 can be connected for conjoint rotation, preferably via splines, to a drive shaft which leads to the vehicle wheel 2 and drives the latter. Unlike the transmission output shaft 18, the drive shaft is not illustrated in the drawing. The drive shaft rotates in a tubular axle housing 15 of the drive unit, which axle housing extends on the central axis A. The axle housing 15 is fastened to the end side of the drive housing 4.

At its vehicle-outer end, the axle housing 15 of the drive unit is provided with the steering knuckle 1. In addition, the brake carrier of the vehicle brake, preferably the brake carrier of a disk brake, is fastened to the axle housing 15. A longitudinal link and optionally a transverse link of the vehicle axle is likewise fastened to the axle housing 15.

In order to fasten the axle housing 15 to the drive housing 4, the axle housing 15 is provided at its vehicle-inner end with a radially expanded flange 16. The flange 16 is screwed rigidly against the end wall 12 of the drive housing 4 by means of a plurality of screws 19. The screws 19 are supported by their screw heads on the flange 16 and engage by way of their threads in threaded blind holes 20 which are formed in the end wall 12.

The connection of the drive housing parts, i.e., of the drive housing part accommodating the electric drive 5, on the one hand, and of the drive housing part accommodating the transmission 6, on the other hand, also takes place by means of screw connections 29, for which purpose the respective ends of these drive housing parts are designed as flanges which are connected fixedly and preferably liquid-tightly to one another via the screw connections 29. Where the drive housing 4 is discussed in general below, this means in each case that drive housing part in which the transmission 6 and preferably two-stage planetary gearing is located.

Figure 1:
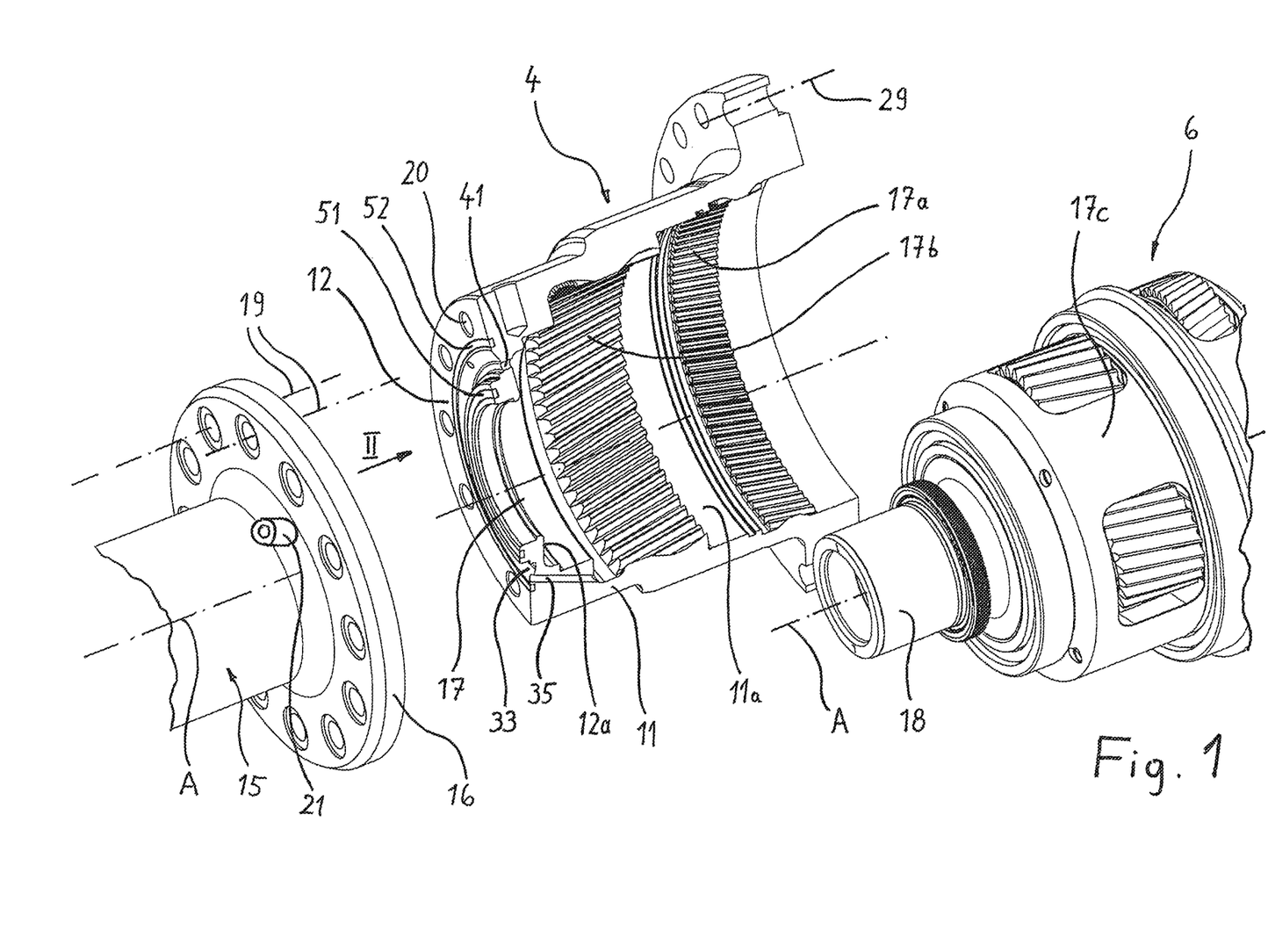
FIG. 1: shows, in a perspective illustration, individual parts of an electric drive axle for a utility vehicle, namely a multi-stage transmission in the form of a double planetary gearing, a drive housing, which receives the transmission, in a partial section, and an axle housing which is fastenable on the end side against the drive housing, wherein the aforementioned parts are reproduced separately for reasons of clarity.

The drive housing has not only the function of a housing, but it is also itself part of the planetary gearing by, according to FIG. 1, the inner side 11a of the housing shell 11 having a helical toothing 17a, which is arranged around the axis of rotation A, of the first transmission stage, and, axially offset, having a helical toothing 17b, which is arranged around the axis of rotation A, of the second transmission stage. The orientation or oblique position of the teeth of the helical toothing 17b is opposed to the teeth of the first helical toothing 17a.

The planet wheels of the two transmission stages of the planetary gearing mesh with the helical toothings 17a, 17b formed on the inside of the housing shell 11. The remaining transmission elements of this planetary gearing are arranged in a transmission carrier 17c which is rotatable on the axis A and is inserted in the manner of a preassembled construction unit into the drive housing 4.

The transmission 6 is designed in the manner of a planetary gearing. The planet wheels and ring gears of the planetary gearing have a tooth oblique position producing a scoop effect, which faces away from the end wall 12, on the coolant and, in the case of a passive sump cooling, producing a scoop effect, which is directed toward the end wall 12, on the coolant.

The central part of the transmission carrier 17c is the transmission output shaft 18 which rotates on the axis A, protrudes out of the likewise centrally arranged transmission opening 17 of the drive housing 4 and extends into the axle housing 15.

In the event of an active circulation cooling, the cooling of the transmission 6 and of its sometimes heavily loaded teeth, pinions and bearings takes place by means of the cooling liquid circulated by an external pump. The pump draws the liquid out of the drive housing 4, conducts it through an external heat exchanger and then conveys it to a connection piece 21 via which the cooling liquid passes over a short distance into the annular chamber 33 and thus back into the circuit. The connection piece 21 is located on the flange 16 of the axle housing 15.

By contrast, in the case of the passive sump lubrication, the liquid is circulated exclusively within the drive housing 4, including the annular chamber 33, with an external pump being omitted.

Irrespective of the type of circulation, the cooling liquid is preferably a transmission oil, and therefore the liquid both lubricates the transmission elements and also transports away heat.

Owing to the design as a planetary gearing, cooling and lubricating liquid is held as a result of centrifugal forces outward against the helical toothings 17a, 17b by the planet wheels. The cooling liquid therefore accumulates on the inner side 11a of the housing shell 11. The measures described in more detail below serve to transport the liquid thus accumulating on the inner side 11a of the housing shell 11 back into more central regions of the transmission 6 and into the region of rolling bearings, for example to the rolling bearings 31 of the transmission output shaft 18.

In order to improve the transport of coolant and the cooling efficiency, an annular chamber 33 which surrounds the central axis of rotation A and the transmission opening 17 in the form of a complete ring and in which coolant can collect for the purpose of further circulation is arranged on the outside of the end wall 12. At the same time, a plurality of coolant channels 35 are formed in the transition region between the housing shell 11 and the end wall 12 of the drive housing, these coolant channels 35 leading from the inner side 11a of the housing shell 11 into the annular chamber 33. Liquid which has accumulated on the inside of the housing shell 11 and in particular on the helical toothings 17a, 17b therefore passes, in a first step, through the coolant channels 35 into the annular chamber 33 which therefore forms a collector for cooling liquid.

An annular chamber takes up space which is not available in the very compactly configured drive housing 4. The annular chamber 33 is therefore located on the outside of the end side of the drive housing 4 facing the vehicle wheel 2. In particular, the annular chamber 33 is not formed solely by the drive housing 4 itself, but rather is formed in another part by the axle housing 15. This is achieved by the annular chamber 33 being formed in one part by an annular conduit formed in the outer side of the end wall 12 and in another part by an annular region on the end side of the flange 16 that faces the end side 12. The annular region on the end side of the flange 16 therefore together with the conduit formed in the end wall 12 forms the annular chamber 33 such that not only are components of the transmission involved in the coolant guiding and circulation, but so too are other components of the drive unit, namely the flange 16, which is in the form of a circular disk, of the axle housing 15.

The circulation of the coolant and the improvement of the cooling efficiency is thereby achieved using specifically the design-induced characteristics of the electric drive unit since the axle housing 15 is also part of this drive unit.

In order that the annular chamber 33 can serve as a collector, there is a multiplicity of the aforementioned coolant channels 35, wherein the coolant channels 35 are preferably arranged distributed uniformly over the circumference of the round drive housing 4.

The cooling liquid which has collected in the annular chamber 33 passes back into the interior of the drive housing 4 via further coolant channels 41. The further coolant channels 41 are likewise present in a multiplicity and arranged distributed uniformly over the circumference of the round drive housing 4. They lead from the annular chamber 33 through the end wall 12 and open in each case on the inner side 12a of the end wall 12.

In the case of the exemplary embodiment described here, the further coolant channels 41 are in each case through bores which extend parallel to the axis of rotation A of the transmission output shaft 18. The further coolant channels 41 are arranged with respect to the axis of rotation A on a diameter which is smaller than the diameter on which the coolant channels 35 are arranged.

In order to transport the cooling medium which has accumulated in the region of the inner side 11a into the annular chamber 33, the coolant channels 35 run at an inclination with respect to the central axis A of the drive unit. The opening of each coolant channel 35 into the interior of the drive housing 4 is located radially further outward than the opening of each coolant channel 35 into the annular chamber 33.

Figure 2:
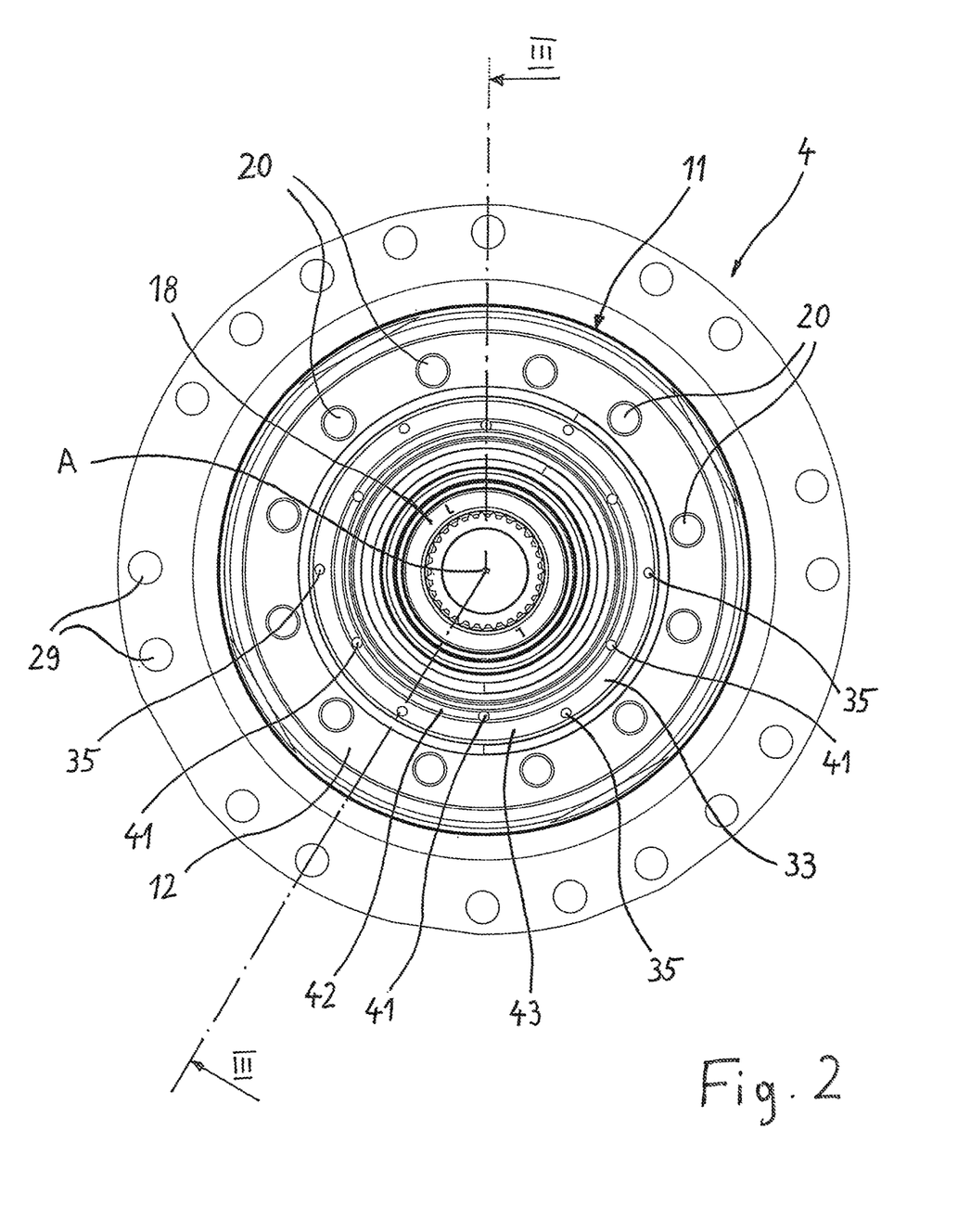
FIG. 2: shows an end-side view of the drive housing corresponding to the viewing direction II reproduced in FIG. 1.

According to FIG. 2, the opening of the coolant channels 35, on the one hand, and of the further coolant channels 41, on the other hand, into the annular chamber 33 in the form of a conduit are configured in such a manner that the further coolant channels 41 open at the base 42 of the annular chamber 33 and the coolant channels 35 open in a side wall 43, which is arranged obliquely with respect to the base 42, of the annular chamber 33. In the exemplary embodiment, the side wall 43 of the conduit into which the coolant channels 35 open is arranged obliquely with respect to the base 42 of the conduit, whereas the other side wall is arranged substantially perpendicularly to the base 42 of the conduit. By means of this configuration, a uniform distribution of coolant within the annular chamber 33 is achieved.

The annular chamber 33 is sealed radially inward via a first seal 51 and radially outward via a second seal 52 such that liquid cannot escape either to the inside or to the outside. The two seals 51, 52 are preferably annular seals arranged around the central axis A. The groove for receiving the respective annular seal is formed in the end side of the end wall 12.

The end wall 12 and the flange 16 are oriented axially with respect to each other by means of centering surfaces 55 which are formed thereon and are in mutual contact. The centering surfaces in the form of a step running in annular form around the central axis A are arranged on a diameter which is smaller than the smallest diameter of the annular chamber 33. The annular centering surfaces 55 are therefore located radially between the annular chamber 33 and the inner first seal 51.

The screws 19 which fasten the flange 16 to the end wall 12 and are arranged on a standardized pitch circle engage by way of their threads in each case in a threaded blind hole 20 which is formed in the end wall 12.

For an overall compact construction, the threaded blind holes 20, on the one hand, and the coolant channels 35 are arranged on different circular portions (FIG. 2). For example, a screw 19 or its threaded blind hole 20 can in each case alternate in the circumferential direction with one of the coolant channels 35. However, the configuration according to FIG. 2, in which the number of coolant channels 35 is half as much as the number of screws 19 or threaded blind holes 20 is preferred.

Figure 4:
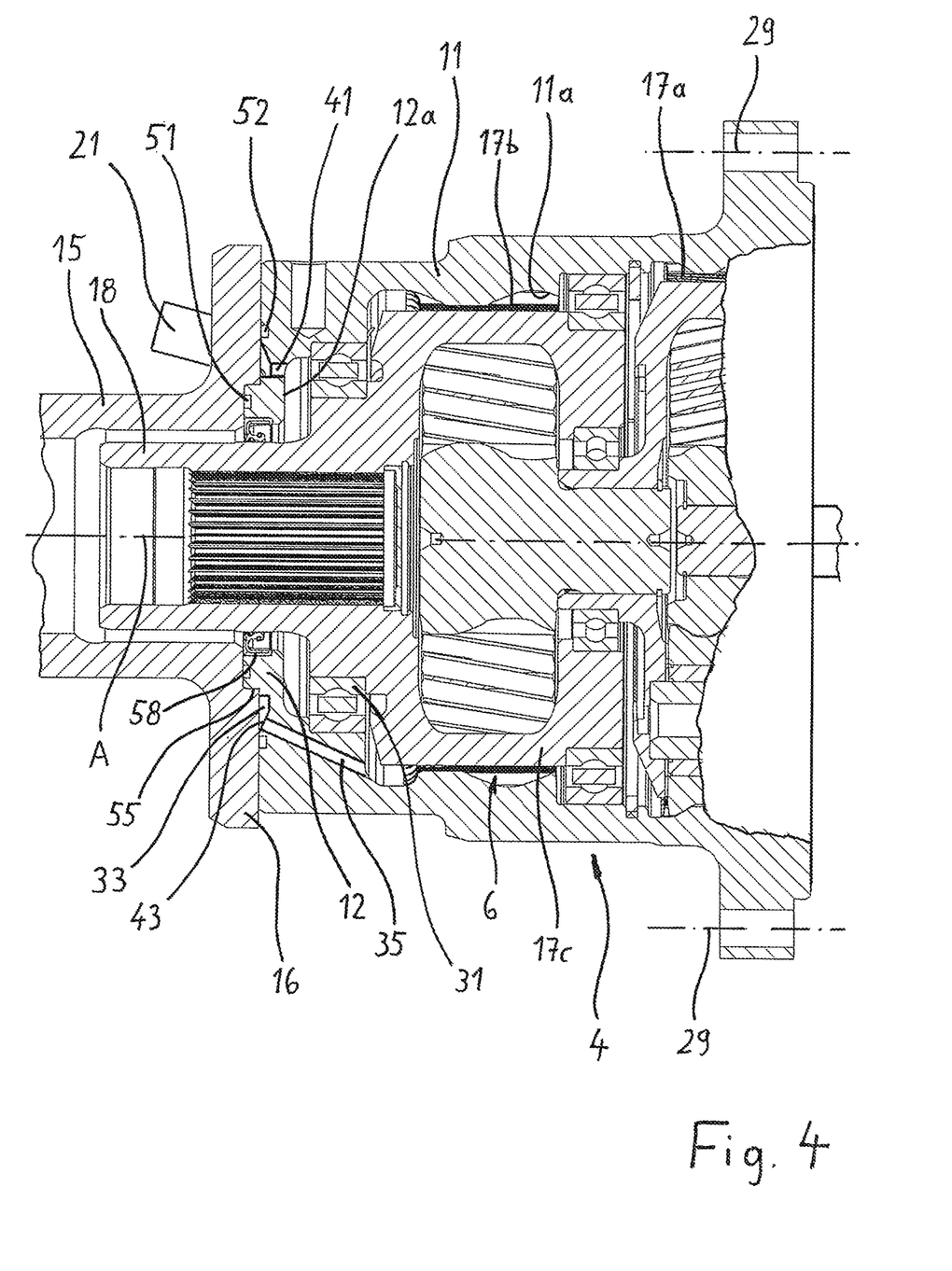
FIG. 4: shows an enlarged detail of FIG. 3.

According to FIG. 4, the further coolant channels 41 are oriented in such a manner that the coolant escaping therefrom passes virtually directly to that rolling bearing 31 which supports the transmission output shaft 18 in the housing shell 11. This improves the cooling and also the lubrication specifically of this heavily loaded rolling bearing 31.

The radial sealing of the transmission output shaft 18 in relation to the surrounding transmission opening 17 takes place by means of a radial shaft sealing ring 58 arranged between these components.

LIST OF REFERENCE CHARACTERS

1 Steering knuckle
2 Vehicle wheel
4 Drive housing
5 Electric drive
6 Transmission
11 Housing shell
11*a* Inner side of housing shell
12 End wall
12*a* Inner side of end wall
15 Axle housing
16 Flange
17 Transmission opening
17*a* Helical toothing
17*b* Helical toothing
17*c* Transmission carrier
18 Transmission output shaft
19 Screw
20 Threaded blind hole
21 Connection piece
29 Screw connection
31 Rolling bearing
33 Annular chamber
35 Coolant channel
41 Coolant channel
42 Base
43 Side wall
51 First seal, annular seal
52 Second seal, annular seal
55 Centering surfaces
58 Radial shaft seal
A Central axis, axis of rotation
M Vehicle center plane

What is claimed is:

1. An electric drive unit for a motor vehicle, the electric drive unit comprising:
   an electric drive (5);
   a multi-stage transmission (6) connected downstream to the electric drive (5) and comprising a transmission output shaft (18);
   a drive housing (4) comprising a housing shell (11) comprising an inner side (11*a*), wherein the inner side (11*a*) annularly surrounds the multi-stage transmission (6), the drive housing (4) further comprising an end wall (12) formed integrally with the housing shell (11) and provided centrally with a transmission opening (17) for the transmission output shaft (18) of the multi-stage transmission (6), wherein the multi-stage transmission (6) is arranged by itself in the drive housing (4) or is arranged together with the electric drive (5) in the drive housing (4), and wherein a cooling liquid is conducted through the drive housing (4) to cool the multi-stage transmission (6);
   an annular chamber (33) arranged around the transmission opening (17) on an outside of the end wall (12) of the drive housing (4);
   first coolant channels (35) formed in the drive housing (4) and configured to conduct the cooling liquid, wherein the first cooling channels (35) lead from the inner side (11*a*) of the housing shell (11) into the annular chamber (33);
   an axle housing (15) surrounding the transmission output shaft (18), wherein the axle housing (15) comprises a flange (16) arranged at an end of the axle housing (15) facing the drive housing (4), wherein the flange (16) is fastened to the end wall (12); and
   wherein an annular region of the flange (16) and the end wall (12) of the drive housing (4) form together the annular chamber (33).

2. The electric drive unit as claimed in claim 1, wherein the annular chamber (33) is partially formed by a conduit in an outer side of the end wall (12).

3. The electric drive unit as claimed in claim 1, wherein the axle housing (15) comprises a steering knuckle (1) arranged at an end of the axle housing (15) facing away from the flange (16), wherein the steering knuckle (1) is configured to mount a vehicle wheel (2) thereon.

4. The electric drive unit as claimed in claim 1, further comprising a coolant connection piece arranged on the flange (16) and a coolant channel leading from the coolant connection piece into the annular chamber (33).

5. The electric drive unit as claimed in claim 1, further comprising a first seal (51) arranged between the flange (16) and the end wall (12) and further comprising a second seal (52) arranged between the flange (16) and the end wall (12), wherein the first seal (51) is an annular seal arranged between the annular chamber (33) and the transmission opening (17), and wherein the second seal (52) is an annular seal arranged around the annular chamber (33).

6. The electric drive unit as claimed in claim 5, wherein the first seal (51) sits in a first annular groove of the end wall (12) and the second seal (52) sits in a second annular groove of the end wall (12), wherein the first and second annular grooves are open toward an outer side of the end wall (12).

7. The electric drive unit as claimed in claim 5, wherein the first seal (51) and the second seals (52) are arranged axially offset in relation to each other in a longitudinal direction of the transmission output shaft (18), wherein the second seal (52) is arranged closer to the electric drive (5) than the first seal (51).

8. The electric drive unit as claimed in claim 1, further comprising second coolant channels (41) formed in the drive housing (4), wherein the second coolant channels (41) lead from the annular chamber (33) through the end wall (12) to an inner side (12*a*) of the end wall (12).

9. The electric drive unit as claimed in claim 8, wherein the second coolant channels (41) are bores arranged, with respect to a central axis (A) of the electric drive unit, on a first diameter, wherein the first coolant channels (35) are arranged, with respect to the central axis (A) of the electric drive unit, on a second diameter, and wherein the first diameter is smaller than the second diameter.

10. The electric drive unit as claimed in claim 9, wherein axes of the second coolant channels (41) are oriented parallel to the central axis (A) of the electric drive unit.

11. The electric drive unit as claimed in claim 8, wherein the second coolant channels (41) open at a base (42) of the annular chamber (33), and wherein the first coolant channels (35) open in a side wall (43) of the annular chamber (33), wherein the annular chamber (33) is in the form of a conduit.

12. The electric drive unit as claimed in claim 1, wherein the flange (16) of the axle housing (15) is fastened to the end wall (12) by screws (19) arranged on a common pitch circle.

13. The electric drive unit as claimed in claim 12, wherein a diameter of the common pitch circle is larger than a largest diameter of the annular chamber (33).

14. The electric drive unit as claimed in claim 13, further comprising a first seal (51) arranged between the flange (16) and the end wall (12) and further comprising a second seal (52) arranged between the flange (16) and the end wall (12), wherein the diameter of the common pitch circle is larger than a diameter of the second seal (52).

15. The electric drive unit as claimed in claim 12, wherein the screws (19) comprise threads engaging threaded blind holes formed in the end wall (12).

16. The electric drive unit as claimed in claim 15, wherein the first coolant channels (35) lead into the annular chamber (33) on circumferential portions of the end wall (12) where none of the threaded blind holes (20) are formed in the end wall (12).

17. The electric drive unit as claimed in claim 1, wherein the end wall (12) and the flange (16) comprise centering surfaces (55) mutually contacting each other and configured to axially orient the end wall (12) and the flange (16) with respect to each other.

18. The electric drive unit as claimed in claim 17, wherein the centering surfaces (55) are arranged on a diameter of the end wall (12) and of the flange (16), wherein the diameter of the end wall (12) and of the flange (16) is smaller than a smallest diameter of the annular chamber (33).

\* \* \* \* \*